(12) United States Patent
Widebrant (10) Patent No.: US 9,826,371 B2
(45) Date of Patent: Nov. 21, 2017

(54) SMS MESSAGE MANAGEMENT (71) Applicant: Telefonaktiebolaget L M Ericsson (publ), Stockholm (SE)

(72) Inventor: Anders Widebrant, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 168 days.

(21) Appl. No.: 14/412,736

(22) PCT Filed: Dec. 3, 2014

(86) PCT No.: PCT/EP2014/076467
§ 371 (c)(1),
(2) Date: Jan. 5, 2015

(87) PCT Pub. No.: WO2016/086990
PCT Pub. Date: Jun. 9, 2016

(65) Prior Publication Data
US 2016/0360386 A1    Dec. 8, 2016

(51) Int. Cl.
*H04W 4/00* (2009.01)
*H04W 4/14* (2009.01)
*H04L 12/58* (2006.01)
*H04L 12/18* (2006.01)

(52) U.S. Cl.
CPC .............. *H04W 4/14* (2013.01); *H04L 12/189* (2013.01); *H04L 51/18* (2013.01); *H04L 51/38* (2013.01)

(58) Field of Classification Search
CPC .................................. H04W 4/14; H04W 4/12
See application file for complete search history.

(56) References Cited

U.S. PATENT DOCUMENTS

| | | | | |
|---|---|---|---|---|
| 8,095,157 | B2 * | 1/2012 | Bharadwaj | H04L 12/189 370/312 |
| 2003/0224814 | A1 * | 12/2003 | Qu | H04L 12/5835 455/517 |
| 2005/0176445 | A1 * | 8/2005 | Qu | H04W 72/005 455/458 |
| 2005/0282564 | A1 * | 12/2005 | Yoo | H04H 20/57 455/466 |
| 2007/0249372 | A1 | 10/2007 | Gao et al. | |

(Continued)

FOREIGN PATENT DOCUMENTS

WO    2013/012539 A1    1/2013

OTHER PUBLICATIONS

International Search Report and Written Opinion in related International Application No. PCT/EP2014/076467 mailed Sep. 10, 2015.

(Continued)

*Primary Examiner* — Shantell L Heiber
(74) *Attorney, Agent, or Firm* — Patent Portfolio Builders PLLC (57) ABSTRACT

A method of a short message service (SMS) manager is disclosed for a wireless communication device supporting a plurality of SMS communication modes, wherein the method comprises receiving, from an application of the wireless communication device, an SMS transmission instruction comprising an SMS payload and an SMS message type characterizer, which comprises at least one of an SMS broadcast flag and an SMS grouping identifier.

5 Claims, 6 Drawing Sheets (56) References Cited

U.S. PATENT DOCUMENTS

| | | | | |
|---|---|---|---|---|
| 2007/0281717 A1* | 12/2007 | Bharadwaj | ............ | H04L 12/189 |
| | | | | 455/466 |
| 2013/0084897 A1* | 4/2013 | Zawaideh | ............... | H04W 4/14 |
| | | | | 455/466 |
| 2013/0282838 A1* | 10/2013 | Zhu | ......................... | H04L 51/12 |
| | | | | 709/206 |

OTHER PUBLICATIONS

Drupal.org, "Allow overriding of default gateway in sms_send," Aug. 6, 2014.

* cited by examiner

SMS MESSAGE MANAGEMENT

TECHNICAL FIELD

The present invention relates generally to the field of short message service—SMS. More particularly, it relates to management of SMS messages.

BACKGROUND

Short message service (SMS) as applied by various communication networks provides a possibility (e.g. for wireless communication devices operating in association with the communication network) to send and receive brief text messages.

The following represents some examples of standardization documentation referring to SMS: GSMA PRD (Group Special Mobile Association-Permanent Reference Document) IR.92-IMS (IP—Internet Protocol-Multimedia Subsystem) Profile for Voice and SMS, 3GPP TS (Third Generation Partnership Project-Technical Specification) 23.040-Technical realization of the Short Message Service (SMS), 3GPP2 C.S0015-0-Short Message Service, 3GPP TS 24.341-Support of SMS over IP networks, and 3GPP2 X.50048-0-Short Message Service over IMS.

The 3GPP and 3GPP2 standardization organizations have defined three principal types of SMS communication (SMS communication modes):
- 3GPP-formatted SMS, using 3GPP radio protocols, handled by 3GPP SMS nodes in the network (legacy 3GPP SMS),
- 3GPP2-formatted SMS, using 3GPP2 radio protocols, handled by 3GPP2 SMS nodes in the network (legacy 3GPP2 SMS), and
- 3GPP- or 3GPP2-formatted SMS packaged in SIP (System Information Packet) messages, using IMS network protocols, handled by IMS nodes in the network (SMS over IMS).

It should be noted that these three SMS communication modes should merely be seen as examples and that embodiments may be equally applicable in relation to other SMS communication modes (alone or in combination with the SMS communication modes above).

Typically, different network nodes that are not functionally interconnected handle respective SMS messages transmitted using the different SMS communication modes.

A wireless communication device may (e.g. depending on its radio access hardware and its software stacks) be capable of handling one or more of the SMS communication modes, for example, the legacy SMS supported by its radio access hardware and SMS over IMS, or all three SMS modes.

An SMS transmission may be initiated by a human user of a wireless communication device to communicate (send and receive SMS messages) with another human user of a wireless communication device or with a network application. Alternatively, an SMS transmission may be initiated by an application (of a wireless communication device or the network) to communicate (send and receive SMS messages) without user input. An example of the latter is Over-the-Air Device Management (OTADM), which may reconfigure a wireless communication device based on the contents of an SMS message sent from the network.

In wireless communication devices which support more than one SMS communication mode, a function typically exists that enable selection of SMS communication mode for sending an SMS message. The selection may, for example, be based on which radio access technique is currently being used for operating with the network and/or on a status of an IMS registration of the wireless communication device. This function may also collate incoming SMS messages received via the different SMS communication modes and provide them to users and/or applications—as applicable—through a common interface. Such a function may be referred to as an SMS manager.

Two main patterns of SMS messaging may be distinguished, regardless of whether the SMS messaging is user initiated or application initiated.

According to the first SMS messaging pattern, the wireless communication device sends or receives a single SMS message that is not directly related to any other SMS message. That is, after the single SMS message is sent or received, no further SMS traffic is expected (except, maybe, on user level).

According to the second SMS messaging pattern, a group comprising more than a single SMS message are directly related to each other and included in an SMS traffic flow. That is, the SMS messages of the group are transmitted or received in a specific sequence.

Problems may arise in relation to the second SMS messaging pattern when a wireless communication device supports several SMS communication modes and the SMS communication mode selection changes during a sequence of transmissions and/or receptions of SMS messages that belong to the same group. Since the different, SMS communication mode specific, network nodes are typically not functionally interconnected there is a potential risk of grouping of SMS messages causing various errors on the network side as will be exemplified further below.

Therefore, there is a need for improved SMS message management for wireless communication devices supporting a plurality of SMS communication modes.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

According to a first aspect, this is achieved by a method of a short message service—SMS—manager for a wireless communication device supporting a plurality of SMS communication modes.

The method comprises receiving (from an application of the wireless communication device) an SMS transmission instruction comprising an SMS payload and an SMS message type characterizer, wherein the SMS message type characterizer comprises at least one of an SMS broadcast flag and an SMS grouping identifier.

The method also comprises selecting one or more of the plurality of SMS communication modes based on the SMS message type characterizer and causing transmission of the SMS payload as an SMS message using the selected one or more SMS communication modes.

The plurality of SMS communication modes may, for example, comprise two, three, or more SMS communication modes. According to some embodiments, the plurality of SMS communication modes comprises one or more of 3GPP-formatted SMS, 3GPP2-formatted SMS, and IMS-based SMS.

The application of the wireless communication device may be an SMS application for interfacing with a user of the wireless communication device according to some embodiments.

In some embodiments, the SMS transmission instruction may also comprise the destination number for the SMS message. The transmission of the SMS payload may be to the destination number.

The SMS grouping identifier may, for example, comprise a serial number according to some embodiments.

The transmission of the SMS payload as an SMS message may be achieved via an SMS stack (corresponding to the selected SMS communication mode) of the wireless communication device.

According to some embodiments, wherein the SMS message type characterizer may comprise the SMS grouping identifier, the SMS message may be a second SMS message, the SMS payload may be a second SMS payload, the SMS grouping identifier may be a second SMS grouping identifier, and a previous (transmitted or received) SMS message communicated using a first SMS communication mode may be a first SMS message comprising a first SMS payload and being assigned a first SMS grouping identifier.

In such embodiments, selecting one or more of the plurality of SMS communication modes may comprise selecting the first SMS communication mode if the second SMS grouping identifier corresponds to the first SMS grouping identifier.

If the second SMS grouping identifier does not correspond to the first SMS grouping identifier, selecting one or more of the plurality of SMS communication modes may comprise selecting any applicable SMS communication mode.

Before receiving the second SMS transmission instruction, the method may (in some embodiments) comprise receiving the previous SMS message using first SMS communication mode, assigning the first SMS grouping identifier to the previous SMS message, saving an association between the first SMS grouping identifier and the first SMS communication mode, and providing an SMS reception instruction comprising the first SMS payload and the first SMS grouping identifier to the application.

Before receiving the SMS transmission instruction (which is a second SMS transmission instruction), the method may (in some embodiments) further comprise receiving a first SMS transmission instruction comprising the first SMS payload and the first SMS grouping identifier from the application, selecting the first SMS communication mode, saving an association between the first SMS grouping identifier and the first SMS communication mode, and causing transmission of the first SMS payload as the first SMS message using the first SMS communication mode.

The method may further comprise discarding the saved association after a (predefined or dynamic) duration of time.

According to some embodiments, the SMS message type characterizer may comprise the SMS broadcast flag.

In such embodiments, selecting one or more of the plurality of SMS communication modes may comprise selecting at least two SMS communication modes of the plurality of SMS communication modes if the SMS broadcast flag is set. The at least two SMS communication modes may, for example, comprise all of the plurality of SMS communication modes.

If the broadcast flag is not set, selecting one or more of the plurality of SMS communication modes may comprise selecting any applicable SMS communication mode.

A second aspect is a method of an application for a wireless communication device supporting a plurality of short message service—SMS—communication modes.

The method comprises providing (to an SMS manager of the wireless communication device) an SMS transmission instruction for transmission of an SMS message. The SMS transmission instruction comprises an SMS payload and an SMS message type characterizer, wherein the SMS message type characterizer comprises at least one of an SMS broadcast flag and an SMS grouping identifier.

According to some embodiments, wherein the SMS message type characterizer may comprise the SMS grouping identifier, the SMS message may be a second SMS message, the SMS payload may be a second SMS payload, the SMS grouping identifier may be a second SMS grouping identifier, and a previous (transmitted or received) SMS message communicated using a first SMS communication mode may be a first SMS message comprising a first SMS payload and being assigned a first SMS grouping identifier.

In such embodiments, the method may further comprise (before providing the SMS transmission instruction) receiving, from the SMS manager, an SMS reception instruction comprising the first SMS payload and the first SMS grouping identifier and setting the second SMS grouping identifier to equal the first SMS grouping identifier if the second SMS payload is an acknowledgement of the reception of the first SMS payload.

In some embodiments, wherein the SMS message type characterizer may comprise the SMS grouping identifier, the SMS message may be a second SMS message, the SMS payload may be a second SMS payload, the SMS grouping identifier may be a second SMS grouping identifier, the SMS transmission instruction may be a second SMS transmission instruction, and a previous SMS message communicated using a first SMS communication mode may be a first SMS message comprising a first SMS payload and being assigned a first SMS grouping identifier.

In such embodiments, the method may further comprise (before providing the second SMS transmission instruction) providing, to the SMS manager, a first SMS transmission instruction comprising the first SMS payload and the first SMS grouping identifier and setting the second SMS grouping identifier to equal the first SMS grouping identifier if the second SMS payload and the first SMS payload are different parts of a third SMS payload. The third SMS payload may, for example, be a payload that is too long to transmit in a single SMS message.

According to some embodiments, the SMS message type characterizer may comprise the SMS broadcast flag.

In such embodiments, the method may further comprise setting the SMS broadcast flag if the SMS payload is of a same kind as any of one or more predefined payloads.

For example, the one or more predefined payloads may comprise one or more of an out-of-memory message, and a memory-available message.

A third aspect is a method of a short message service—SMS—manager for a wireless communication device supporting a plurality of SMS communication modes.

The method comprises receiving, from an application of the wireless communication device, an SMS transmission instruction comprising an SMS payload, determining if the SMS payload is of a same kind as any of one or more predefined payloads, selecting one or more of the plurality of SMS communication modes based on the determination, and causing transmission of the SMS payload using the selected one or more SMS communication modes.

For example, the one or more predefined payloads may comprise one or more of an out-of-memory message, a memory-available message, and an acknowledgement message.

Selecting one or more of the plurality of SMS communication modes may, in some embodiments, comprise selecting at least two SMS communication modes of the plurality of SMS communication modes if the SMS payload is of a same kind as one of the one or more predefined payloads.

In some embodiments, the second aspect may additionally have features identical with or corresponding to any of the various features as explained above for the first aspect.

A fourth aspect provides a computer program product comprising a computer readable medium, having thereon a computer program comprising program instructions. The computer program is loadable into a data-processing unit and adapted to cause execution of the method according to any of the first, second and/or third aspect when the computer program is run by the data-processing unit.

A fifth aspect is a short message service—SMS—manager for a wireless communication device supporting a plurality of SMS communication modes.

The SMS manager is adapted to receive, from an application of the wireless communication device, an SMS transmission instruction comprising an SMS payload and an SMS message type characterizer, wherein the SMS message type characterizer comprises at least one of an SMS broadcast flag and an SMS grouping identifier.

The SMS manager is adapted to select one or more of the plurality of SMS communication modes based on the SMS message type characterizer and cause transmission of the SMS payload as an SMS message using the selected one or more SMS communication modes.

In some embodiments, the fifth aspect may additionally have features identical with or corresponding to any of the various features as explained above for the first aspect.

A sixth aspect is an application for a wireless communication device supporting a plurality of short message service—SMS—communication modes.

The application is adapted to provide, to an SMS manager of the wireless communication device, an SMS transmission instruction for transmission of an SMS message. The SMS transmission instruction comprises an SMS payload and an SMS message type characterizer, wherein the SMS message type characterizer comprises at least one of an SMS broadcast flag and an SMS grouping identifier.

In some embodiments, the sixth aspect may additionally have features identical with or corresponding to any of the various features as explained above for the second aspect.

A seventh aspect is a short message service—SMS—manager for a wireless communication device supporting a plurality of SMS communication modes.

The SMS manager is adapted to receive, from an application of the wireless communication device, an SMS transmission instruction comprising an SMS payload, determine if the SMS payload is of a same kind as any of one or more predefined payloads, select one or more of the plurality of SMS communication modes based on the determination, and cause transmission of the SMS payload using the selected one or more SMS communication modes.

In some embodiments, the seventh aspect may additionally have features identical with or corresponding to any of the various features as explained above for the third aspect.

An eighth aspect is an arrangement of a wireless communication device supporting a plurality of SMS communication modes.

The arrangement may comprise the SMS manager of the fifth aspect and the application of the sixth aspect or it may comprise the SMS manager of the seventh aspect.

A ninth aspect provides a wireless communication device supporting a plurality of SMS communication modes and comprising the arrangement of the eighth aspect.

Tenth and eleventh aspects are, respectively, an SMS transmission instruction and an SMS reception instruction as explained above in relation to the first and second aspects.

A twelfth aspect is a protocol for an interface between an application and an SMS manager of a wireless communication device supporting a plurality of SMS communication modes, the protocol comprising the SMS transmission instruction of the tenth aspect and the SMS reception instruction of the eleventh aspect.

According to some embodiments, any of the aspects above may additionally have features identical with or corresponding to any of the various features as explained for other aspects, when applicable.

An advantage of some embodiments is that more robust SMS communication is provided for when a group comprising more than a single SMS message are directly related to each other.

Another advantage of some embodiments is that a wireless communication device may apply dynamic SMS communication mode selection without risking network errors.

Yet another advantage of some embodiments is that no modification is required in the network.

An advantage of some embodiments is that only the SMS manager needs to be modified.

An advantage of some embodiments is that only the SMS manager and the application(s) need to be modified.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where SMS managing is achieved for a wireless communication device supporting a plurality of SMS communication modes.

The wireless communication device typically comprises an SMS manager, one or more applications and a software stack (or similar functional unit) for each of the supported SMS communication modes.

The applications may comprise an SMS application and/or one or more other applications acting as SMS sources and/or sinks.

Some embodiments described herein relate to methods for the SMS manager to coordinate transmission/reception of SMS messages to avoid problems that may arise for a group of more than one SMS message directly related to each other, as will be exemplified later.

For example, the interface between the SMS manager and the applications is extended with means to identify a group (also referred to herein as a dialog) of more than one SMS message directly related to each other. Such SMS messages should, typically, be sent using the same SMS communication mode for the entire group.

Alternatively or additionally, the interface between the SMS manager and the applications is extended with means to identify SMS messages that should be sent using more than one SMS communication mode.

Alternatively or additionally, the SMS manager may be equipped with means to identify SMS message types that should be sent using more than one SMS communication mode and or SMS message types that should be sent using the same SMS communication mode as another SMS message.

Three examples of situations of the second SMS messaging pattern (a group comprising more than a single SMS message being directly related to each other and included in an SMS traffic flow) will now be described with reference to FIGS. 1A-C.

A situation where a payload for SMS transmission is too large to fit into a single SMS message (typically a maximum amount of characters is allowed in a single SMS message) is typically approached by dividing the payload into two or more parts and transmitting the parts sequentially as respective SMS messages. This situation will be referred to herein as a multipart message situation.

Figure 1A:
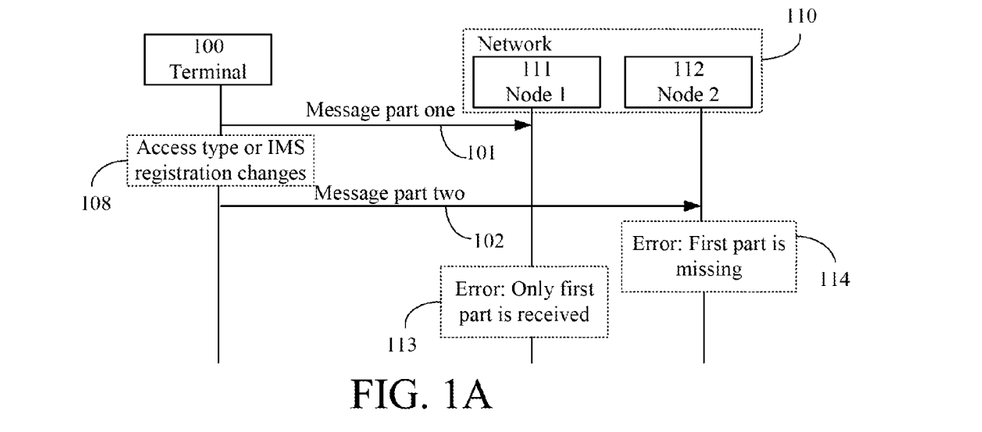
FIGS. 1A-C are signaling diagrams illustrating various problems that may be mitigated according to some embodiments.

FIG. 1A illustrates a multipart message situation, where a wireless communication device (Terminal) 100 transmits a message part one 101 and a message part two 102 in sequence to a network 110.

If the SMS communication mode primarily applied by the wireless communicating device 100 changes between the two transmissions 101, 102 (as illustrated by 108 in FIG. 1A), the message part one 101 is received by a first network node (Node 1) 111 of the network 110 while the message part two 102 is received by a second network node (Node 2) 112 of the network 110. The change of SMS communication mode 108 may, for example, be due to a change in which radio access type is available to the terminal and/or a change in validity of an IMS registration.

That the two message parts 101, 102 are received by different network nodes 111, 112 typically results in errors registered in both network nodes, since each of the network nodes only receives one part of the multipart message. This is illustrated in FIG. 1A by the error 113 in Node 1 which only receives the first part 101 of the message and by the error 114 in Node 2 where the first part 101 of the message is missing.

There are also situations where a message acknowledgement is to be sent as a response to a received SMS message. For example, a wireless communication device may receive an SMS message with an indication that the sending party requires an acknowledgement that the message was received. Typically, the wireless communication device will automatically transmit the acknowledgement as an SMS message to the sending party in these situations. This situation will be referred to herein as a message acknowledgement situation.

Figure 1B:
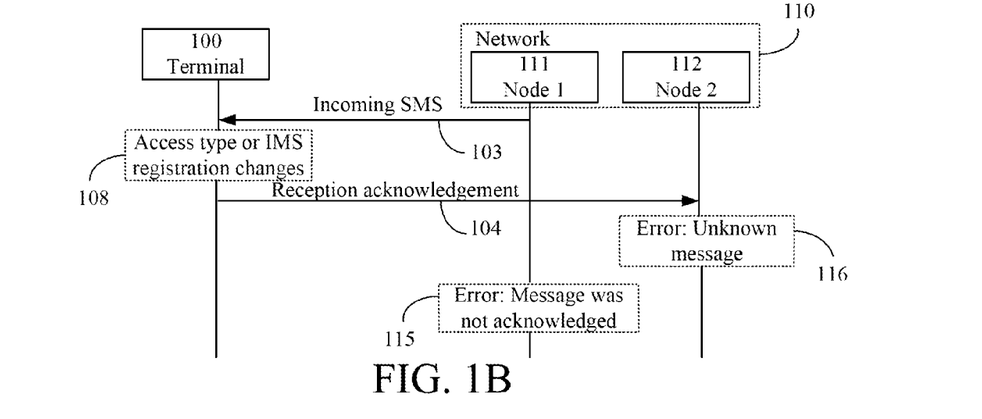

FIG. 1B illustrates a message acknowledgement situation, where a wireless communication device (Terminal) 100 receives an incoming SMS 103 from a network 110 and transmits a corresponding reception acknowledgement 104 to the network 110.

If the SMS communication mode primarily applied by the wireless communicating device 100 changes between the reception 103 and the transmission 104 (as illustrated by 108 in FIG. 1B), the reception acknowledgement 104 is received by a network node (Node 2) 112 of the network 110 that is different from the network node (Node 1) 111 of the network 110 that transmitted the incoming SMS 103.

That the reception acknowledgement 104 is received by another network node than the one that transmitted the incoming SMS 103 typically results in errors registered in both network nodes. This is illustrated in FIG. 1B by the error 115 in Node 1 which does not receive an acknowledgment of the transmitted message 103 and by the error 116 in Node 2 which receives an unknown message (unexpected acknowledgement) 104.

A situation when a wireless communication device has run out of memory to store incoming messages is typically approached by the wireless communication device transmitting a special "out of memory" message to the network, so that messages for that wireless communication device can be stored in the network until the wireless communication device has enough memory available to successfully receive messages again. The wireless communication device is expected to signal when it has enough memory available again by transmitting another special "memory available" message to the network. These events will be referred to herein as out of memory signaling.

Figure 1C:
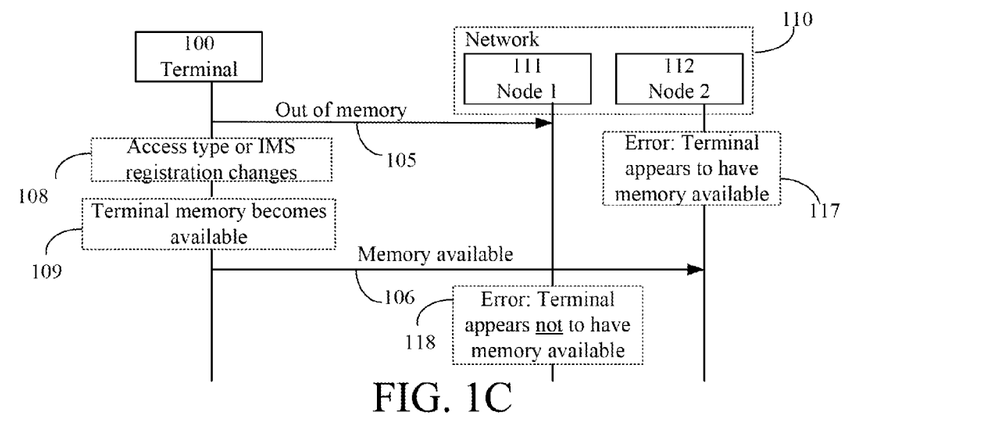

FIG. 1C illustrates out of memory signaling, where a wireless communication device (Terminal) 100 transmits an out of memory message 105 and (when terminal memory becomes available as illustrated by 109) a memory available message 106 to a network 110.

If the SMS communication mode primarily applied by the wireless communicating device 100 changes between the two transmissions 105, 106 (as illustrated by 108 in FIG. 1C), the out of memory message 105 is received by a first network node (Node 1) 111 of the network 110 while the memory available message 106 is received by a second network node (Node 2) 112 of the network 110.

That the two messages 105 and 106 are received by different network nodes 111, 112 typically results in both network nodes (possibly at various points in time) having erroneous information about the terminal 100. This is illustrated in FIG. 1C by the error 117 in Node 2 which does not receive the out of memory message 105 and therefore thinks that the terminal has memory available and by the error 118 in Node 1 which does not receive the memory available message 106 and therefore thinks that the terminal does not have memory available even when it has.

Apart from these illustrative examples, applications in the wireless communication devices and/or in the network may also define their own protocols using SMS as the data transport, with multiple messages in sequence. As mentioned before, a messaging pattern with multiple prescribed messages in sequence will also be referred to herein as a "dialog" of messages.

Figure 2:
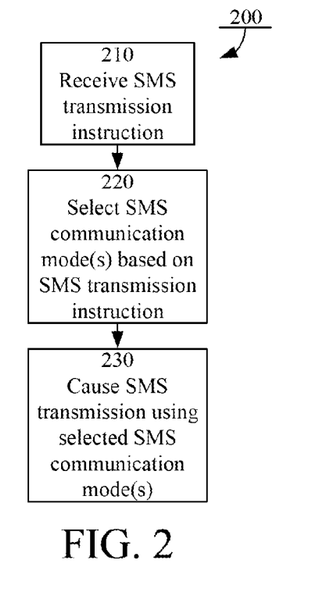
FIG. 2 is a flowchart illustrating method steps according to some embodiments.

FIG. 2 illustrate an example method 200 of an SMS manager of a wireless communication device supporting a plurality of SMS communication modes.

The method starts in step 201 where an SMS transmission instruction comprising an SMS payload is received from an application of the wireless communication device. In step 220, one or more of the plurality of SMS communication modes are selected based on the SMS transmission instruction, and transmission of the SMS payload as an SMS message is caused in step 230 using the selected one or more SMS communication modes.

In some embodiments, the selection of step 220 may comprise determining if the SMS payload is of a same kind as any of one or more predefined payloads and selecting one or more of the plurality of SMS communication modes based on the determination. The predefined payloads may, for example, be stored in a list associated with or comprised in the SMS manager.

For example, predefined payload kinds may be defined (e.g. out of memory, memory available) that should be transmitted using more than one (e.g. all) possible SMS communication mode and/or predefined payload kinds may be defined (e.g. acknowledgement) that should be transmitted using the same SMS communication mode as a related SMS message.

In some embodiments, the SMS transmission instruction received in step 210 also comprises an SMS message type characterizer which, in turn, comprises at least one of an SMS broadcast flag and an SMS grouping identifier. Then, the selection of step 220 may comprise selecting one or more of the plurality of SMS communication modes based on the SMS message type characterizer.

Figure 3:
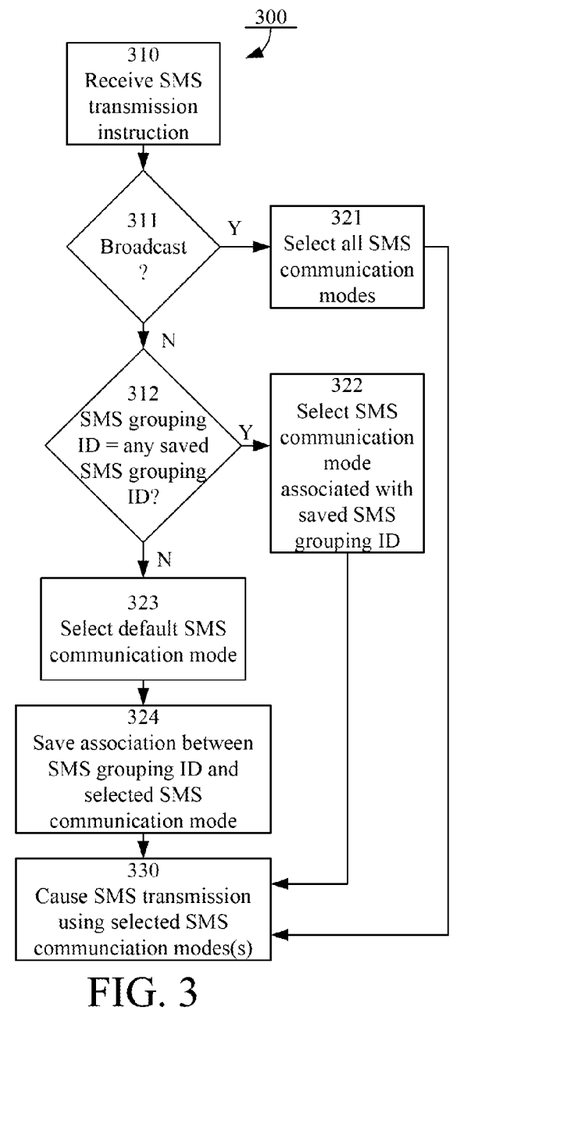
FIG. 3 is a flowchart illustrating method steps according to some embodiments.
Figure 4:
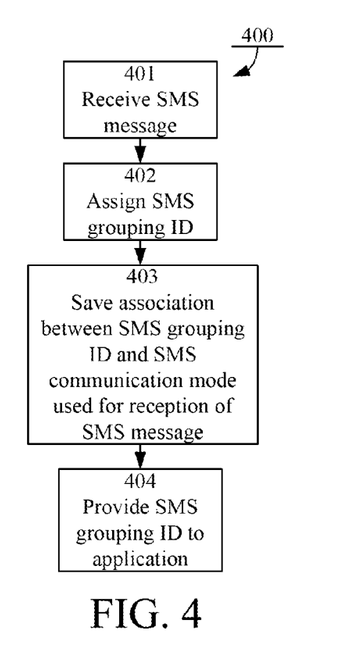
FIG. 4 is a flowchart illustrating method steps according to some embodiments.

FIGS. 3 and 4 illustrate methods 300 and 400, respectively, of an SMS manager of a wireless communication device supporting a plurality of SMS communication modes, where the methods exemplify some embodiments where the SMS transmission instruction also comprises an SMS message type characterizer. The method 400 of FIG. 4 may, in some embodiments, be performed prior to step 310 of FIG. 3. Alternatively, the method 300 of FIG. 3 may be performed in isolation and/or the method 400 of FIG. 4 may be performed in isolation.

The method 300 starts in step 310, where an SMS transmission instruction comprising an SMS payload and an SMS message type characterizer is received from an application of the wireless communication device (compare with step 210 of FIG. 2).

If the SMS message type characterizer comprises a broadcast flag and if the broadcast flag is set (Y-path out from step 311), the method proceeds to step 321 where at least two (e.g. all as illustrated in FIG. 3) SMS communication modes are selected (compare with step 220 of FIG. 2), and then to step 330.

If the SMS message type characterizer does not comprise a broadcast flag or if the broadcast flag is not set (N-path out from step 311), the method proceeds to step 312 where an SMS grouping identifier (ID) verification is performed.

If the SMS message type characterizer comprises an SMS grouping identifier and if the SMS grouping identifier corresponds to a saved SMS grouping identifier of a previous (transmitted or received) SMS message (Y-path out from step 312), the method proceeds to step 322 where the SMS communication mode associated with the saved SMS grouping identifier is selected (compare with step 220 of FIG. 2), and then to step 330.

If the SMS message type characterizer does not comprise an SMS grouping identifier or if the SMS grouping identifier does not correspond to any saved SMS grouping identifier (N-path out from step 312), an SMS communication mode is selected according to a default procedure in step 323, and an association between the SMS grouping identifier (if applicable) and the selected SMS communication mode is saved in step 324. The default procedure may comprise any suitable selection approach.

Transmission of the SMS payload as an SMS message is then caused in step 330 using the selected one or more SMS communication modes (compare with step 230 of FIG. 2).

The method 400 starts in step 401 where an SMS message is received by the SMS manager. The SMS manager assigns an SMS grouping identifier to the received SMS message in step 402 and saves, in step 403, an association between the SMS grouping identifier and the SMS communication mode used for the reception of the SMS message in step 401. In step 404, the SMS grouping identifier is provided to the relevant application together with the payload of the received SMS message as an SMS reception instruction.

Thus, a saved association between an SMS grouping identifier and an SMS communication mode may relate to a received SMS message (step 403 or FIG. 4) or to a transmitted SMS message (step 324 of FIG. 3).

Figure 5:
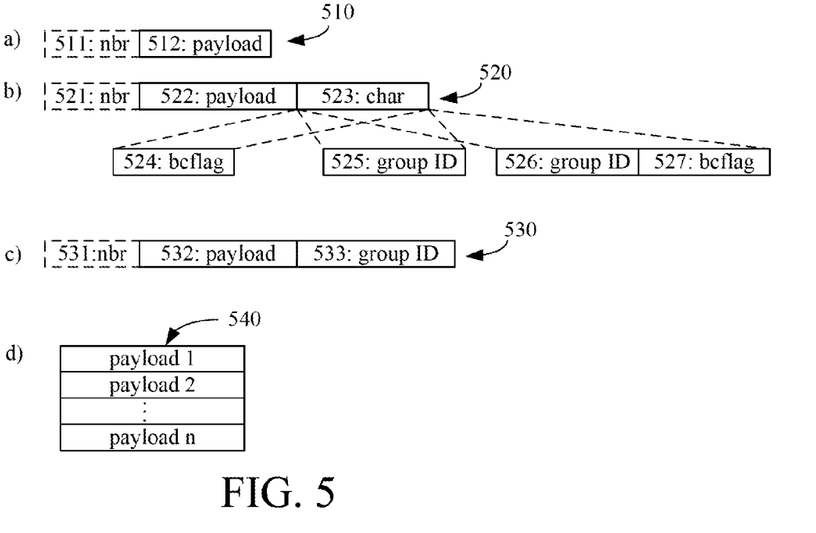
FIG. 5 is a schematic drawing illustrating SMS transmission instructions, SMS reception instructions, and predefined payloads according to some embodiments.

FIG. 5a) illustrates an SMS transmission/reception instruction 510 comprising a payload 512 and a number (nbr) 511 identifying to/from whom the corresponding SMS message is communicated.

The SMS transmission/reception instruction 510 is provided over an interface between an SMS manager and an application of the wireless communication device. This type of SMS transmission/reception instruction may be a conventional (i.e. according to legacy approaches) and may also be applied in some embodiments, for example, when the selection of step 220 in FIG. 2 comprises determining if the SMS payload is of a same kind as any of one or more predefined payloads.

FIG. 5b) illustrates an SMS transmission instruction 520 comprising a payload 522, a number (nbr) 521 identifying to whom the corresponding SMS message is communicated, and an SMS message type characterizer (char) 523. As illustrated the SMS message type characterizer 523 may comprise an SMS broadcast flag (bcflag) 524, an SMS grouping identifier (group ID) 525 or a combination of an SMS broadcast flag (bcflag) 527, an SMS grouping identifier (group ID) 526.

The SMS transmission instruction 520 is provided over an interface between an SMS manager and an application of the wireless communication device. This type of SMS transmission instruction may be applied in some embodiments, for example, when the selection of step 220 in FIG. 2 is based on an SMS message type characterizer (as also exemplified in connection to FIGS. 3 and 4).

FIG. 5c) illustrates an SMS reception instruction 530 comprising a payload 532, a number (nbr) 531 identifying from whom the corresponding SMS message is communicated, and an SMS grouping identifier (group ID) 533.

The SMS reception instruction 530 is provided over an interface between an SMS manager and an application of the wireless communication device. This type of SMS reception instruction may be applied in some embodiments, for example, when the selection of step 220 in FIG. 2 is based on an SMS message type characterizer (as also exemplified in connection to FIGS. 3 and 4).

Examples of implementations of the SMS transmission instruction include:
  send_sms(destination_number, payload)
  send_sms(destination_number, payload, dialog)

send_sms(destination_number, payload, broadcast)
send_sms(destination_number, payload, dialog, broadcast)

Example implementations of the SMS reception instruction include:
sms_received(source_number, payload)
sms_received(source_number, payload, dialog)

FIG. 5d) illustrates an example of a list 540 of one or more predefined payloads (payload 1, payload 2, . . . , payload n).

The list 540 may be associated with, or comprised in, the SMS manager and be applied in some embodiments, for example, when the selection of step 220 in FIG. 2 comprises determining if the SMS payload is of a same kind as any of one or more predefined payloads.

Figure 6:
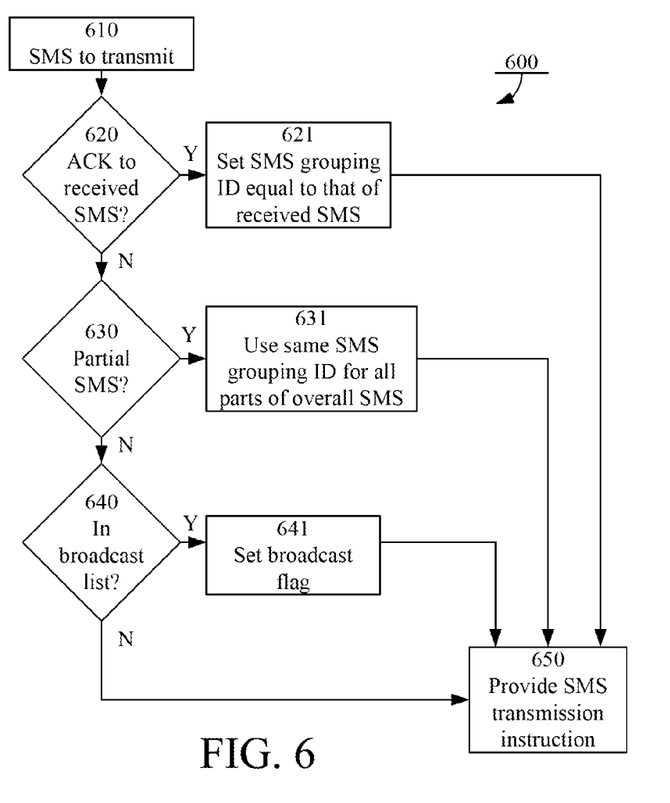
FIG. 6 is a flowchart illustrating method steps according to some embodiments.

FIG. 6 illustrate an example of a method 600 of an application for a wireless communication device supporting a plurality of SMS communication modes. The method 600 may, for example, be performed by an application in connection with an SMS manager of the wireless communication device performing the method 300 or the method 200 (if selection is based on SMS message type characterizer).

Generally, the method 600 comprises, when there is a payload to be transmitted as an SMS message (step 610), providing (in step 650) an SMS transmission instruction to the SMS manager, wherein the SMS transmission instruction comprises an SMS payload and an SMS message type characterizer, which in turn comprises at least one of an SMS broadcast flag and an SMS grouping identifier.

In this particular example, the method comprises, when there is a payload to be transmitted as an SMS message (step 610), determining whether the payload is an acknowledgement (ACK) to an earlier received SMS. If so (Y-path out from step 620) the SMS grouping identifier is set to equal the SMS grouping identifier of the earlier received SMS in step 621.

If the payload is not an acknowledgement (N-path out from step 620), it is determined whether the payload is a partial payload (multipart message situation). If so, (Y-path out from step 630) the same SMS grouping identifier is used for all parts of the multipart message (step 631).

If the payload is not a partial payload (N-path out from step 630), it is determined whether the payload is of the same kind as any of one or more predefined payloads. A similar list as that of FIG. 5d) may be associated with or comprised in the application for this purpose. If so, (Y-path out from step 640), the broadcast flag is set in step 641.

The SMS grouping identifier may be set to a new (or at least currently not associated) SMS grouping identifier before provision of the SMS transmission instruction if the N-path out of step 640 is followed.

In various embodiments, the steps 620, 630 and 640 may be performed in different orders and/or one or more of these steps may be completely omitted (e.g. if only broadcast flag is implemented or if only SMS grouping identifier is implemented).

Figure 7A:
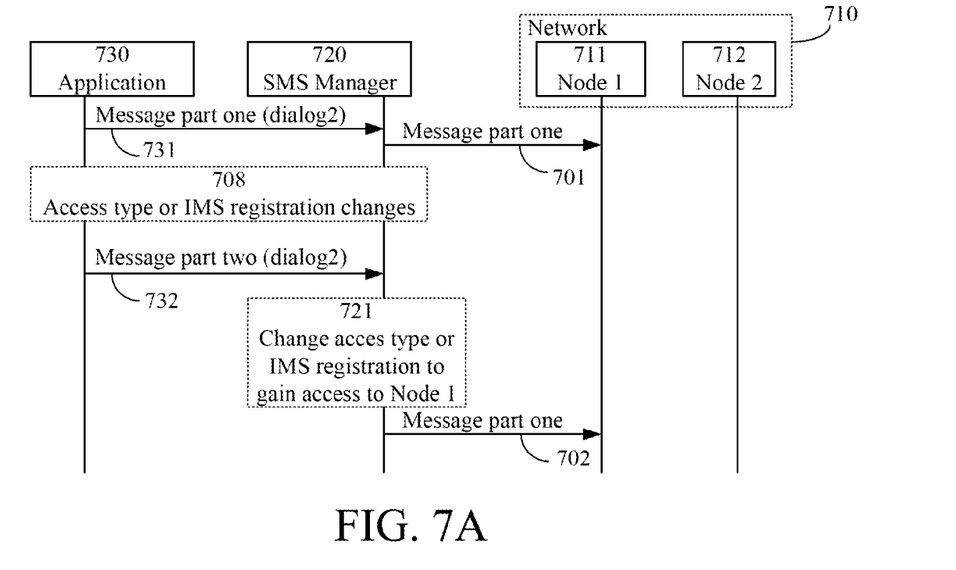
FIGS. 7A-C are signaling diagrams illustrating various applications of some embodiments.
Figure 7B:
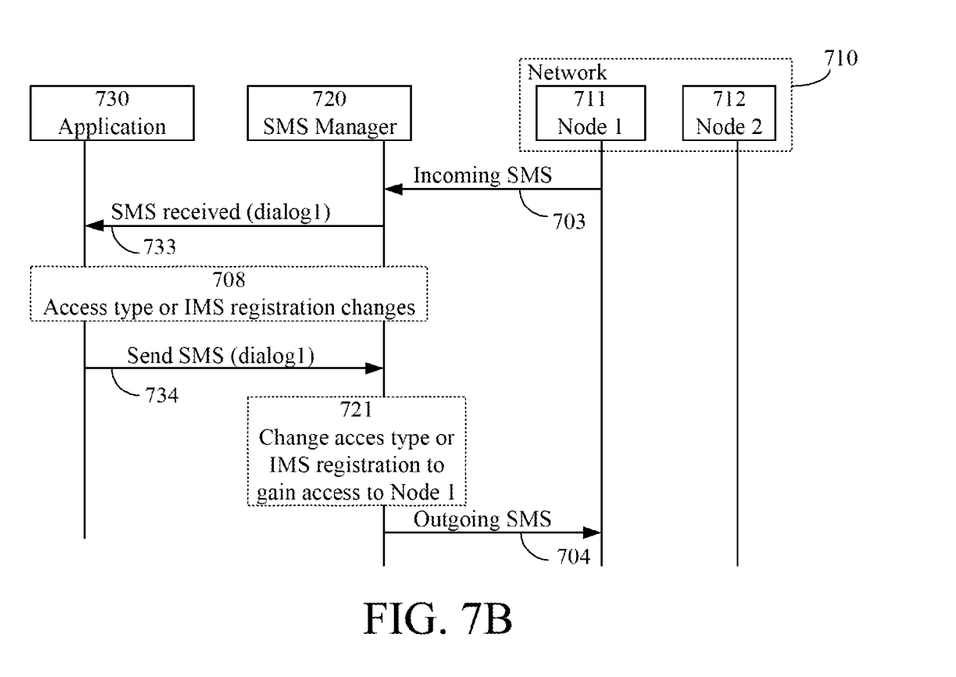
Figure 7C:
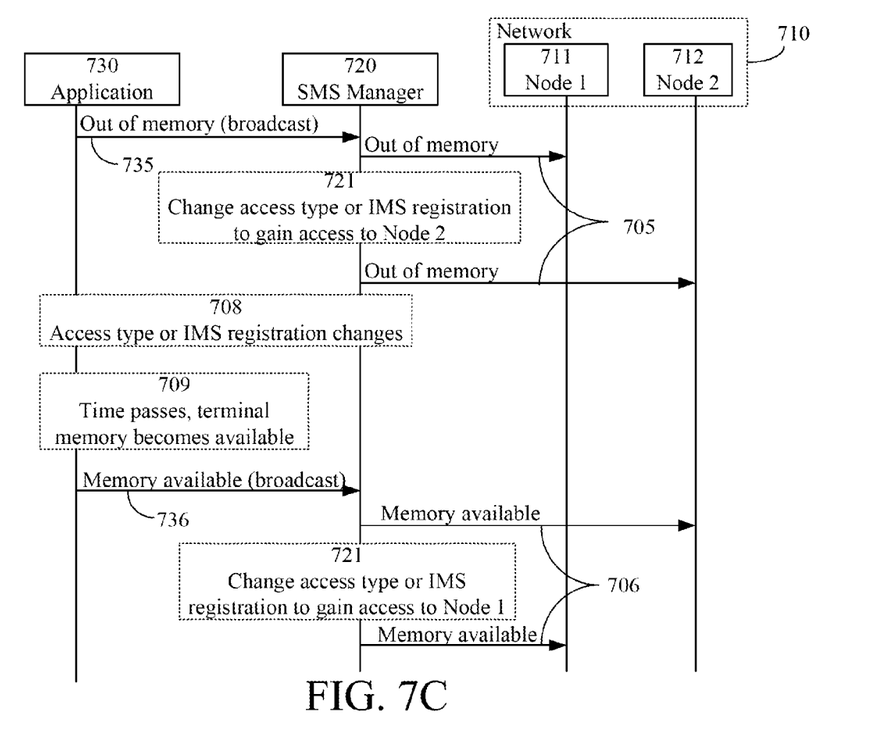

FIGS. 7A-C illustrate how embodiments of the invention may provide solutions to the problems described in relation to FIGS. 1A-C, respectively.

For multipart messages, the application assigns an SMS grouping identifier (a dialog identity, "dialog2") to the first part of the message, and then reuses the same SMS grouping identifier for the second (and further) part of the message. The SMS manager may then ensure that all related messages are sent using the same SMS communication mode, and all message parts will reach the same network node.

This is illustrated in FIG. 7A, where an application 730 provides an SMS manager 720 with two SMS transmission instructions comprising the same SMS grouping identifier (message part one/two (dialog2)) 731, 732. The SMS manager 720 causes transmission of the message part one 701 and the message part two 702 in sequence to a network 710 comprising first and second network nodes (Node 1, Node 2) 711, 712.

Even if the SMS communication mode primarily applied by the wireless communicating device changes between the two transmissions 731, 732 (as illustrated by 708 in FIG. 7A), the SMS manager assures that the two messages are transmitted using the same SMS communication mode and, hence, received by the same network node (Node 1 in this case). This is enabled by the inclusion of the SMS grouping identifier (dialog2) in the SMS transmission instructions from the application and may be realized via a change in radio access type or an IMS registration as illustrated in 721.

In the case of message acknowledgement, the incoming SMS that needs to be acknowledged is assigned a unique SMS grouping identifier ("dialog1") by the SMS manager. When the application sends the acknowledgement for the incoming message, it specifies the same SMS grouping identifier, which causes the SMS manager to ensure that the acknowledgement is sent over the same SMS communication mode as the incoming message, and, hence, reaches the network node that sent the incoming SMS.

This is illustrated in FIG. 7B, where an SMS manager 720 assigns an SMS grouping identifier (dialog1) to an incoming SMS 703 from a network node (Node 1) 711 of a network 710 also comprising another network node (Node 2) 712. The SMS manager provides an application 730 with a corresponding SMS reception instruction comprising the assigned SMS grouping identifier (SMS received (dialog1)) 733. The application assigns the same SMS grouping identifier to the acknowledgement and provides the SMS manager with a corresponding SMS transmission instruction comprising the same SMS grouping identifier (send SMS (dialog1)) 734. The SMS manager 720 causes transmission of the outgoing SMS 704 to the network 710.

Even if the SMS communication mode primarily applied by the wireless communicating device changes between the reception 733 and the transmission 734 (as illustrated by 708 in FIG. 7B), the SMS manager assures that the acknowledgement is transmitted using the same SMS communication mode as the incoming SMS and, hence, received by the same network node (Node 1 in this case) that transmitted the incoming SMS. This is enabled by the inclusion of the SMS grouping identifier (dialog1) in the SMS reception/transmission instructions to/from the application and may be realized via a change in radio access type or an IMS registration as illustrated in 721.

In the case of out of memory signaling, the broadcast flag is used by the application to indicate that both the out of memory message and the memory available message should be sent over more than one (typically all) of the available SMS communication modes. Hence, an accurate memory status of the wireless communication device may be maintained by several (or all) network nodes.

This is illustrated in FIG. 7C, where an application 730 provides an SMS manager 720 with two SMS transmission instructions comprising a set broadcast flag (out of memory (broadcast) and, later, memory available (broadcast)) 735, 736. The SMS manager 720 causes transmission of these messages 705, 706 to all nodes (Node 1, Node 2) 711, 712 of a network 710.

Even if the SMS communication mode primarily applied by the wireless communicating device changes between the two messages 735, 736 (as illustrated by 708 in FIG. 7C), the SMS manager assures that the two messages are transmitted using all SMS communication modes and, hence, received by all network nodes. This is enabled by the inclusion of the broadcast flag (broadcast) in the SMS transmission instructions from the application and may be realized via changes in radio access type or IMS registrations as needed (illustrated in 721).

Generally, a wireless communication device may comprise an SMS manager and one or more applications according to some embodiments. The SMS manager may, for example, be adapted to perform method steps according to the methods shown in any of the FIGS. 2-3, 7A-C. The one or more applications may, for example, be adapted to perform method steps according to the methods shown in any of the FIGS. 4, 6, 7A-C.

Figure 8:
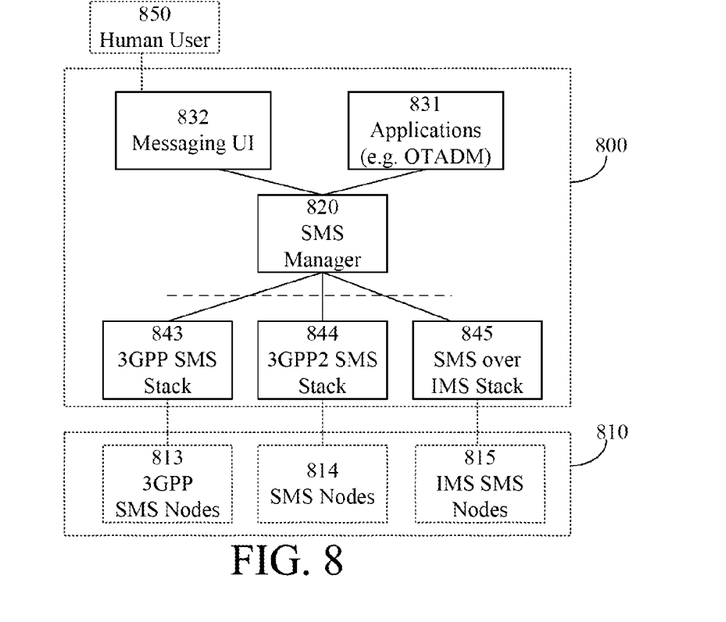
FIG. 8 is a block diagram illustrating an arrangement according to some embodiments.
Figure 9:
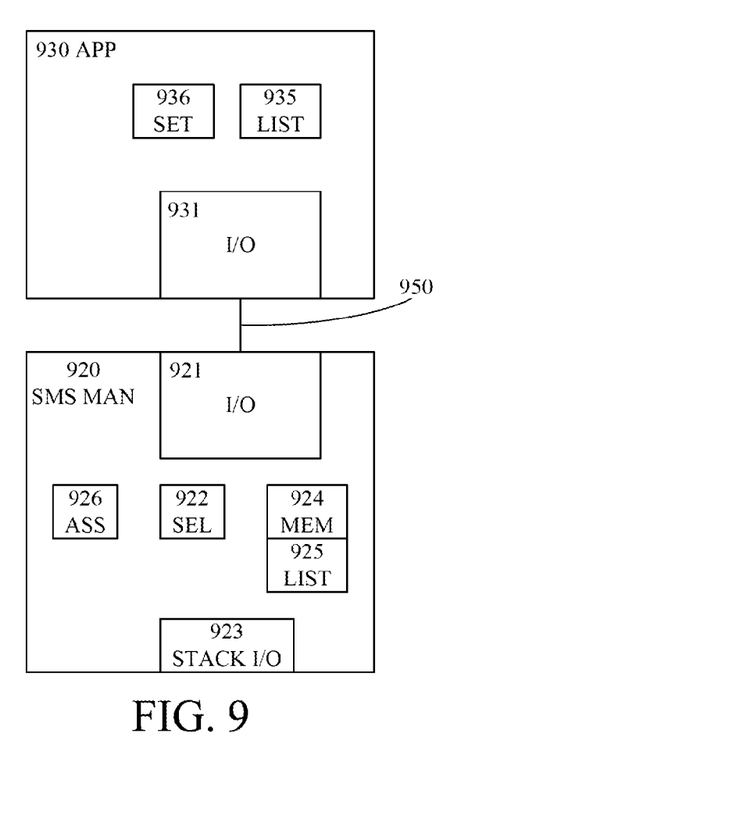
FIG. 9 is a block diagram illustrating an arrangement according to some embodiments.

A few examples of arrangements for a wireless communication device are illustrated in FIGS. 8 and 9.

FIG. 8 illustrates an arrangement where a wireless communication device 800 supports three SMS communication modes via, respectively, a 3GPP SMS stack 843, a 3GPP2 SMS stack 844, and an SMS over IMS stack 845. Each of the three SMS communication modes are associated with respective SMS nodes 813, 814, 815 in a network 810.

An SMS manager 820 provides for a selection among the three SMS communication mode according to methods described herein, and interfaces with one or more applications 831, 832 of the wireless communication device 800. As mentioned before one of the applications may be an SMS application such as a messaging user interface (UI) 832 for interaction with a human user 850.

Thus, according to some embodiments, two changes are made in the SMS manager. The SMS manager is provided with an ability to identify several SMS messages as being part of the same dialog that should use the same SMS communication mode and an ability to determine that an outgoing SMS should be sent using all (or at least more than one) SMS communication modes.

To let the SMS manager collect several messages into a dialog that should be handled using the same SMS communication mode, some embodiments add a dialog parameter to both functions (SMS reception/transmission instruction) in the interface to the application(s). This parameter may comprise a unique identifier, such as a serial number. In some embodiments, values of the parameter may be re-used after a certain amount of time and/or as long as they are not currently associated to a SMS communication mode.

When a message arrives to the wireless communication device, the SMS manager may be responsible for giving it a unique dialog identifier and providing it to the appropriate application. When an application sends a message that is part of the same dialog as a previously received message, it may be responsible for using the same dialog identifier as the one provided by the SMS manager for the received message.

Note that the SMS manager may typically provide a unique identifier for every incoming message, regardless of whether or not it is part of an application session comprising several messages. In some embodiments, every new incoming message is comprised in its own dialog and the application must use that dialog's identifier for outgoing response messages.

When an application sends a message that is not a response in any existing dialog, it may be responsible for picking a unique dialog identifier for the message. If the application then sends another message that is part of the same dialog as the message it sent previously, it may be responsible for using the same dialog identifier as the one it used when sending the previous message.

The SMS manager may maintain a record of the SMS communication mode that was used for each incoming message, and may be responsible for using this data to ensure that a message sent by an application with a dialog value that matches a previously sent or received message is sent using the same type of SMS communication mode as the matching message. If there is no previously recorded message with a matching dialog identifier, the message can be sent over any available SMS communication mode.

Given the information that an outgoing message belongs to a particular dialog, the SMS manager may choose to delay sending this message until the SMS communication mode associated with that dialog is available. Alternatively, it may return an error message to the application. Yet alternatively, it may take independent actions to switch to the SMS communication mode which should be used.

To let the SMS manager identify messages that should be sent over all types of SMS, some embodiments add a broadcast parameter to the send function (SMS transmission instruction) in the interface to the application(s). This parameter may be set to either true or false. When true, the SMS manager may send the message using all possible (or at least more than one) SMS communication modes. When false, the message can be sent over any available SMS communication mode (unless restrained by the dialog identifier as described above).

The interface and functionality described above enable the SMS manager to ensure that related messages are sent over the same SMS communication mode, and that messages that must be delivered over all SMS communication mode can be so. Note that the application(s) do not have to be aware of which SMS communication modes are supported, available, or used.

FIG. 9 illustrates an application (APP) 930, an SMS manager (SMS MAN) 920, and an interface 950 there between according to some embodiments.

The application comprises an interface port (I/O) 931 connected to the interface 950 for provision of an SMS transmission instruction (in some embodiments comprising the SMS message type characterizer) to the SMS manager as explained above (compare with step 650 of FIG. 6). The interface port 931 may also be adapted to receive an SMS reception instruction from the SMS manager as explained above.

The application 930 may also comprise an SMS message type characterizer setter (SET) 936 which is adapted to set the broadcast flag and/or the SMS grouping identifier as explained above (compare with steps 621, 631, 641 of FIG. 6).

The application 930 may also comprise a list 935 of predefined payloads that may be used by the setter 935 to determine whether or not the broadcast flag should be set as explained above (compare with step 640 of FIG. 6).

The SMS manager comprises an interface port (I/O) 921 connected to the interface 950 for reception of an SMS transmission instruction (in some embodiments comprising an SMS message type characterizer) from the application as explained above (compare with step 210 of FIG. 2 and step 310 of FIG. 3). The interface port 921 may also be adapted to provide an SMS reception instruction to the application as explained above (compare with step 404 of FIG. 4).

The SMS manager also comprises an SMS communication mode selector (SEL) 922, which is adapted to select SMS communication mode according to any of the approaches described above (compare with step 220 of FIG. 2 and steps 321, 322, 323 of FIG. 3).

The SMS manager comprises an SMS stack interface (STACK I/O) 923 for causing transmission using the selected SMS communication mode.

The SMS manager may also comprise an assigner (ASS) 926 adapted to assign an SMS grouping identifier to an incoming SMS message as described above (compare with step 402 of FIG. 4).

The SMS manager may also comprise a memory (MEM) 924 associated with (or comprised in) the SMS manager.

The memory 924 may store associations between SMS grouping identifiers and SMS communication modes as described above (compare with step 324 of FIG. 3 and step 403 of FIG. 4).

Alternatively or additionally, the memory 924 may comprise a list 925 of predefined payloads (for use by the selector 922 to determine whether a payload of the SMS transmission instruction is of a same kind as any of a number of predefined payloads) as described above.

The SMS manager 920 and/or the application 930 may additionally implement any functionality described herein, as suitable.

Embodiments described herein provide various advantages, for example, a means for wireless communication devices to use multiple SMS communication modes in a network where SMS nodes are not synchronized internally.

Compared to having the wireless communication device use only one SMS communication mode for a given network, an advantage provided by some embodiments is that wireless communication devices can use the most appropriate SMS communication mode for the currently active access type and IMS registration. Without application of some embodiments, wireless communication devices may (in some circumstances) be unable to send and receive messages and/or use an unnecessary amount of network resources by switching access types to enable the desired SMS communication mode.

Compared to internal network synchronization between network nodes for different SMS communication modes, an advantage provided by some embodiments is that no network node upgrading is required.

Furthermore, some embodiments provide solutions without having to expose knowledge regarding which SMS communication modes the wireless communication device supports or uses to SMS applications. Thus, a relatively simple application implementation will work on wireless communication devices that support multiple SMS communication modes as well as on wireless communication devices that only support one SMS communication mode. This makes SMS application implementation and the SMS manager interface simple.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware. All such forms are contemplated to be within the scope of this disclosure.

Embodiments may be implemented within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, or a mobile gaming device.

Figure 10:
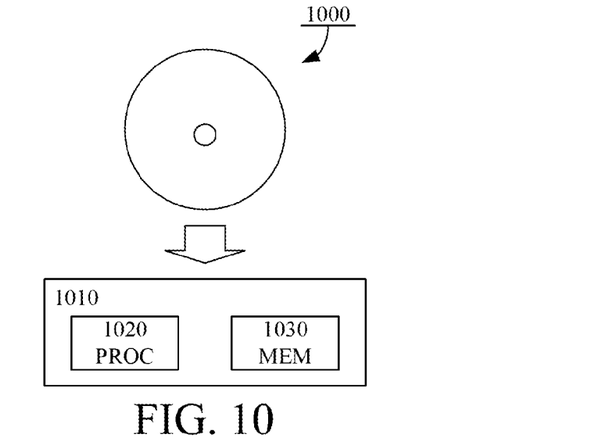
FIG. 10 is a schematic drawing illustrating a computer readable medium according to some embodiments.

According to some embodiments, a computer program product comprises a computer readable medium such as, for example, a USB-stick, a plug-in card, an embedded drive, a diskette or a CD-ROM as illustrated by 1000 in FIG. 10. The computer readable medium may have stored thereon a computer program comprising program instructions. The computer program may be loadable into a data-processing unit (PROC) 1020, which may, for example, be comprised in a wireless communication device 1010. When loaded into the data-processing unit 1020, the computer program may be stored in a memory (MEM) 1030 associated with or integral to the data-processing unit 1020. According to some embodiments, the computer program may, when loaded into and run by the data-processing unit, cause the data-processing unit to execute method steps according to, for example, the methods shown in any of the FIGS. 2-4, 6, 7A-C.

Reference has been made herein to various embodiments. However, a person skilled in the art would recognize numerous variations to the described embodiments that would still fall within the scope of the claims. For example, the method embodiments described herein describe examples of methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of an application for a wireless communication device supporting a plurality of short message service (SMS) communication modes, the method comprising:
   providing, to an SMS manager of the wireless communication device, an SMS transmission instruction for transmission of an SMS message, the SMS transmission instruction comprising an SMS payload and an SMS message type characterizer, wherein the SMS message type characterizer comprises an SMS grouping identifier,
   wherein the SMS message is a second SMS message, the SMS payload is a second SMS payload, the SMS grouping identifier is a second SMS grouping identifier, and a previous SMS message communicated using a first SMS communication mode is a first SMS message comprising a first SMS payload and being assigned a first SMS grouping identifier, and
   wherein the method further comprises, before providing the second SMS transmission instruction:
   receiving, from the SMS manager, an SMS reception instruction comprising the first SMS payload and the first SMS grouping identifier; and setting the second SMS grouping identifier to equal the first SMS grouping identifier if the second SMS payload is an acknowledgement of the reception of the first SMS payload.

2. A method of an application for a wireless communication device supporting a plurality of short message service (SMS) communication modes, the method comprising:
  providing, to an SMS manager of the wireless communication device, an SMS transmission instruction for transmission of an SMS message, the SMS transmission instruction comprising an SMS payload and an SMS message type characterizer, wherein the SMS message type characterizer comprises an SMS grouping identifier,
  wherein the SMS message is a second SMS message, the SMS payload is a second SMS payload, the SMS grouping identifier is a second SMS grouping identifier, the SMS transmission instruction is a second SMS transmission instruction, and a previous SMS message communicated using a first SMS communication mode is a first SMS message comprising a first SMS payload and being assigned a first SMS grouping identifier, and
  wherein the method further comprises, before providing the second SMS transmission instruction:
  providing, to the SMS manager, a first SMS transmission instruction comprising the first SMS payload and the first SMS grouping identifier; and
  setting the second SMS grouping identifier to equal the first SMS grouping identifier if the second SMS payload and the first SMS payload are different parts of a third SMS payload.

3. An application for a wireless communication device supporting a plurality of short message service (SMS) communication modes, the application adapted to:
  provide, to an SMS manager of the wireless communication device, an SMS transmission instruction for transmission of an SMS message, the SMS transmission instruction comprising an SMS payload and an SMS message type characterizer, wherein the SMS message type characterizer comprises an SMS grouping identifier,
  wherein the SMS message is a second SMS message, the SMS payload is a second SMS payload, the SMS grouping identifier is a second SMS grouping identifier, and a previous SMS message communicated using a first SMS communication mode is a first SMS message comprising a first SMS payload and being assigned a first SMS grouping identifier, and
  wherein the application is further adapted to, before providing the second SMS transmission instruction:
  receive, from the SMS manager, an SMS reception instruction comprising the first SMS payload and the first SMS grouping identifier; and
  set the second SMS grouping identifier to equal the first SMS grouping identifier if the second SMS payload is an acknowledgement of the reception of the first SMS payload.

4. An application for a wireless communication device supporting a plurality of short message service (SMS) communication modes, the application adapted to:
  provide, to an SMS manager of the wireless communication device, an SMS transmission instruction for transmission of an SMS message, the SMS transmission instruction comprising an SMS payload and an SMS message type characterizer, wherein the SMS message type characterizer comprises an SMS grouping identifier,
  wherein the SMS message is a second SMS message, the SMS payload is a second SMS payload, the SMS grouping identifier is a second SMS grouping identifier, the SMS transmission instruction is a second SMS transmission instruction, and a previous SMS message communicated using a first SMS communication mode is a first SMS message comprising a first SMS payload and being assigned a first SMS grouping identifier, and
  wherein the application is further adapted to, before providing the second SMS transmission instruction:
  provide, to the SMS manager, a first SMS transmission instruction comprising the first SMS payload and the first SMS grouping identifier; and
  set the second SMS grouping identifier to equal the first SMS grouping identifier if the second SMS payload and the first SMS payload are different parts of a third SMS payload.

5. A short message service (SMS) reception instruction for an interface between an application and an SMS manager of a wireless communication device supporting a plurality of SMS communication modes, the SMS reception instruction comprising a first SMS payload and being assigned a first SMS grouping identifier, wherein the first SMS grouping identifier is for setting, by the application, a second SMS grouping identifier to equal the first SMS grouping identifier if a second SMS payload is an acknowledgement of reception of the first SMS payload.

* * * * *